Nov. 14, 1972　　　R. P. FRITSCH　　　3,702,691
MULTISTAGE MACHINE FOR THE PLASTIFICATION AND
EXTRUSION OF SYNTHETIC PLASTIC MATERIALS
Filed July 27, 1971　　　　　　　　　　　　6 Sheets-Sheet 1.

Fig. 1a

INVENTOR.
RUDOLF P. FRITSCH
BY

Fig. 3a

INVENTOR.
RUDOLF P. FRITSCH
BY

United States Patent Office 3,702,691
Patented Nov. 14, 1972

3,702,691
MULTISTAGE MACHINE FOR THE PLASTIFICATION AND EXTRUSION OF SYNTHETIC PLASTIC MATERIALS
Rudolf P. Fritsch, Stuttgart, Germany, assignor to C. F. Scheer & Cie, Stuttgart, Germany
Filed July 27, 1971, Ser. No. 166,354
Claims priority, application Germany, Aug. 1, 1970,
P 20 38 327.1
Int. Cl. B01f 7/08
U.S. Cl. 259—192                          22 Claims

ABSTRACT OF THE DISCLOSURE

A machine for plasticizing and extruding pulverulent thermoplastic or duroplastic material has a first stage with a barrel for two intermeshing plasticizing and metering screws which convey plastic material from the center toward both ends of the barrel and a second stage having a barrel for one or two extruding screws which serve to convey plasticized material from the ends toward a discharge opening in the center of the respective barrel. The ends of the barrel in the second stage communicate with the ends of the barrel in the first stage. The drive for the screws has a single electric motor which rotates the screws by way of gear transmissions with interchangeable gears. The screw or screws of the second stage transmit torque to the screws of the first stage and the screw or screws of the second stage can be removed or reinserted by moving axially through a gear of at least one of the transmissions which drive the screws of the first stage. The barrel of the first stage can be opened lengthwise to afford access to the respective screws.

BACKGROUND OF THE INVENTION

The present invention relates to machines for the treatment of plastic materials, and more particularly to improvements in machines for multistage treatment of preferably pulverulent plastic materials which are to be converted into a homogeneous mass that is ready for introduction into the cavity or cavities of an injection molding or analogous apparatus.

Multistage machines are normally employed when the material which is to be plasticized is furnished in pulverulent rather than in customary granular form. The making of granulate normally involves a compounding operation, i.e., a treatment during which colorants, pigments, stabilizers, antioxidants, fillers, extenders, etc. are incorporated into the starting material so that the treatment of granulae merely involves plastification in order to obtain a mass which is ready for introduction into a mold cavity or the like. The plasticizing apparatus for granular plastic material normally employ a single slowly rotating conveying and condensing screw which effects a plastification and compression of granular starting material.

When the starting material is in pulverulent form, the plastification normally takes place in a first stage and the extrusion of plasticized material in a second stage of the processing machine. Each stage normally comprises one or more conveying screws and each such screw is normally provided with mirror symmetrical left-hand and right-hand flights which meet at the center of the screw. The pulverulent starting material is cheaper than granular material and the manufacturer is also in a position to compound the pulverulent material with one or more ingredients in the first or plasticizing stage of the machine. As a rule, the first stage comprises two parallel screws which are in mesh and rotate in the same direction, and the second stage comprises one or more screws which extrude the plasticized and compounded material through one or more orifices or like outlets.

A drawback of presently known multistage machines for the processing of plastic material is that they are very expensive and that their conversion from treatment of one type of starting material to treatment of another type of material is extremely costly and time-consuming. Moreover, the versatility of presently known multistage machines is rather limited. The high initial cost is due mainly to the complicatedness of the drive for the screws in the two stages, and such complicatedness is due to the fact that the drive must be capable of rotating the screws in each of the two stages at a plurality of speeds. It is customary to provide for the screw or screws of the first stage a drive which is entirely independent of the drive for the screw or screws of the second stage, and each such drive is provided with a separate prime mover. This enables the drives to rotate the respective screws with a desirable force and at a speed which is best suited for the processing of particular types of starting material.

SUMMARY OF THE INVENTION

An object of the invention is to provide a novel and improved multistage machine which is particularly suited for the processing of pulverulent plastic materials and which is cheaper, simpler, more rugged and just as versatile as presently known multistage machines.

Another object of the invention is to provide a two-stage machine wherein each of several conveying screws is readily accessible for the purposes of inspection, cleaning and/or replacement and wherein the access to various screws can be gained without necessitating complete or even substantial dismantling of the machine.

A further object of the invention is to provide a multistage machine which can be rapidly converted for treatment of different types of plastic materials and wherein the heat which develops in the region of rotating screws can be dissipated and led away in a simple and inexpensive way.

An additional object of the invention is to provide a multistage machine of the above outlined character wherein the drive for the screws in various stages can operate properly with a single prime mover.

The invention is embodied in a multistage machine for the plastification and extrusion of synthetic plastic materials, particularly of thermoplastic or duroplastic materials which are supplied in pulverulent form. The machine comprises a first stage which is preferably the plasticizing stage and a second stage which preferably serves as an extruder. One of the two stages has a barrel and a pair of intermeshing parallel rotary conveying screws in the barrel, and the other stage also comprises a barrel for a single screw or for a pair of intermeshing screws. All of the screws have mirror symmetrical left-hand and right-hand flights which meet at the centers of the respective screws and serve to convey plastic material from the center toward both ends of the respective barrel or vice versa. The screw or screws of the other stage are parallel with the screws of the one stage.

In accordance with a feature of the invention, the drive for the screws of the two stages comprises a single prime mover, such as a constant-speed or variable-speed electric motor, and a plurality of transmissions (preferably gear transmissions with interchangeable gears to allow for changes in their ratio) which transmit torque from the prime mover to the screw or screws in one of the stages and from such screw or screws to the screw or screws of the other stage. At least one of the transmissions which transmit torque from the screw or screws of one stage to the screw or screws of the other stage is designed to allow for convenient removal and reinsertion of one of the thus connected screws by moving the removable screw in the axial direction.

If the other stage comprises a single screw, the drive preferably includes three transmissions one of which transmits torque from the prime mover to the single screw, another of which transmits torque from one end of the single screw to one of the screws in the one stage and a further of which transmits torque from the other end of the single screw to the other screw in the one stage.

If the other stage also comprises two intermeshing screws, the drive comprises four transmissions the first pair of which connects the prime mover with different screws of the other stage and the second pair of which connects the thus driven screws with different screws of the one stage.

The novel features which are considered as characteristic of the invention are set forth in particular in the appended claims. The improved multistage machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1b is a similar longitudinal vertical sectional view of the other half of the multistage machine;

FIG. 2 is a transverse vertical sectional view as seen in the direction of arrows from the line 2—2 of FIG. 1a;

DESCRIPTION OF THE PREFERRED EMBODIMENTS

Figure 1A:
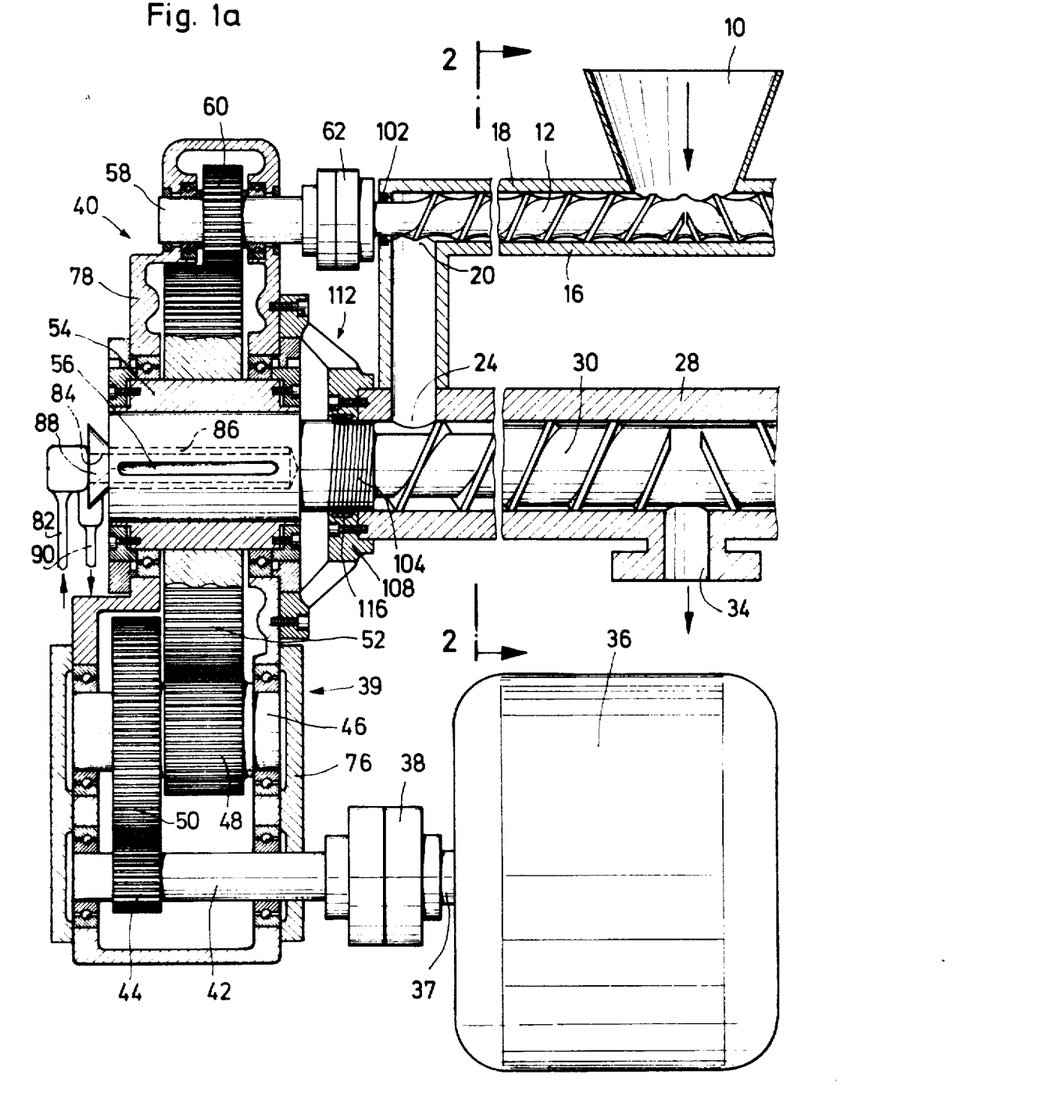
FIG. 1a is a central longitudinal vertical sectional view of one half of a multistage machine which embodies one form of the invention and wherein the extruder comprises a single screw.
Figures 1B, 2:
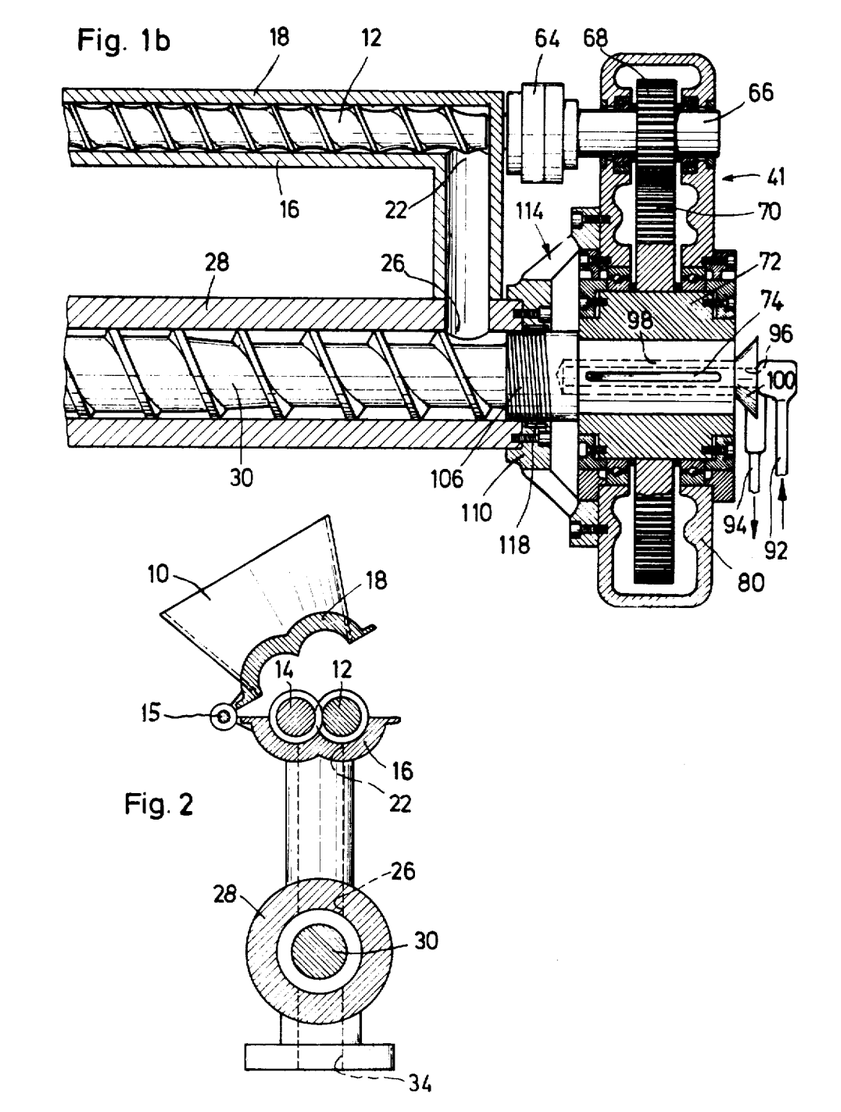

Referring first to FIGS. 1a, 1b and 2, there is shown a two-stage plasticizing and extruding machine for conversion of pulverulent thermoplastic or duroplastic material into a homogeneous mass which is ready for introduction into a mold or the like to be converted into shaped plastic articles. The puverulent material is admitted by way of a centrally located hopper 10 into the first stage of the machine which includes a horizontal two-piece cylinder or barrel 16, 18 for two plasticizing and metering screws 12, 14. The screws 12, 14 have right-hand and left-hand flights which meet at the center below the outlet of the hopper 10 to convey the material toward the opposite ends of the barrel. The two flights of each of the two screws 12, 14 are miror symmetrical with reference to a vertical plane which is normal to the axes of the screws. The two sections or shells 16, 18 are pivotally connected to each other, as at 15 (FIG. 2). During forcible travel toward the opposite ends of the barrel, the material which is conveyed by the flights of the screws 12 and 14 can undergo a compounding treatment which involves incorporation of colorants and pigments, plasticizers, stabilizers, fillers, extenders, etc. as well as a more or less pronounced change in the characteristics of conveyed material.

For the sake of simplicity, the FIGS. 1a and 1b show that each of the screws 12, 14 is provided with a single left-hand and right-hand flight; however, it is equally within the purview of the invention to employ screws with more complicated (twin, triple, etc.) flights. Thus, and depending on the nature of compounding operation in the barrel for the screws 12 and 14, these screws may be mounted in parallelism with each other and in such a way that their flights intermesh (see FIG. 2) and that each thereof rotates in the same direction. It is further often desirable to seal each of the helices or screw threads formed by successive turns of the flight of a screw by sealing members having an outer ridge such as to at least substantially closing said helices of the screw, while providing the other screw with corresponding recesses which interrupt its flight in the regions meshing with the sealing members. (For greater detail please refer to a prior application of this applicant filed Jan. 27, 1971, U.S. Ser. No. 110,115.)

The barrel which includes the sections 16 and 18 has two downwardly extending outlets 20 and 22 which are respectively located at the left-hand and right-hand ends of the barrel and serve to convey plasticized material to the inlets 24, 26 of the cylinder or barrel 28 in the second stage or extruder of the machine. The barrel 28 accommodates a single screw 30 which also comprises mirror symmetrical left-hand and right-hand flights serving to advance the material entering at 24, 26 toward the center of the barrel 28 and into the opening a discharging member 34. The flights of the screw 30 subject the material to a compressing action and the opening of the member 34 discharges a homogeneous stream of properly plasticized material which can be introduced into one or more cavities of a mold, not shown. The opening of the discharging member 34 can be dimensioned and configurated in such a way that it discharges a continuous strand of plasticized material or it may contain a torpedo or a like member so as to form an annular orifice for continuous discharge of a tubular parison which can be used in a blow-molding apparatus.

It will be noted that the mode of transporting the material through the two stages of the machine is such that the screws 12, 14 of the first stage (plasticizer) as well as the screw 30 of the second stage (extruder) will be subjected to negligible axial stresses which would tend to move these screws to the left or to the right. This is due to the fact that the screws 12, 14 and 30 are provided with mirror symmetrical left-hand and right-hand flights, that the hopper 10 is located midway between the ends of the barrel of the first stage, that the discharging member 34 is located midway between the ends of the barrel 28, and that the outlets 20, 22 are equidistant from the hopper 10.

The improved machine can be used with particular advantage for processing of pressure-sensitive synthetic plastic materials which, when entering the second stage, are to be subjected only to such pressures which are needed to discharge a homogeneous strand. Thus, the plastification takes place in the first stage during transport by the screws 12 and 14, and the thus plasticized material is immediately introduced into the range of the screw 30 in the second stage or extruder of the machine. Consequently, the screw 30 will subject such plastic material only to stresses which are necessary for insuring that the consistency of the strand leaving by way of the discharging member 34 is satisfactory for immediate introduction into an injection molding, blow molding or other apparatus which is associated with the improved machine. This is in contrast to the operation of machines wherein the extruder receives plastic material in granular form and must subject such material to pressures which are needed to bring about satisfactory plastification prior to evacuation of material for the purposes of introducing it into a mold or the like.

Another advantage of the heretofore described parts of the improved machine is that, in addition to savings in energy and proper treatment of plastic material at acceptable pressures, the screws of the two stages can be mounted in a novel and improved way in order to permit convenient access, evacuation, cleaning and reintroduction into the respective stages. Moreover, the illustrated mounting of the screws 12, 14 and 30 renders it possible to employ a relatively simple, compact and rugged drive which transmits torque to the screws in both stages of the machine.

The drive of the machine employs a single prime mover 36 which is shown in the form of an electric motor having an output shaft 37. This output shaft drives the input shaft 42 of a gear transmission 39 by way of a safety clutch or overload clutch 38. The transmission 39 further comprises a casing 76 and a set of meshing gears and serves to rotate the screw 30 in the second stage of the machine. The gears in the casing 76 of the transmission 39 rotate the screw 30 at a speed which is less than the speed of the input shaft 42. The driven left-hand end portion of the screw 30 transmits torque to the screw 12 in the first stage of the machine by way of a gear transmission 40 which includes a casing 78. A further gear transmission 41 receives torque from the right-hand end portion of the screw 30 and serves to rotate the second screw 14 in the first stage of the machine. The transmission 41 has a casing 80.

Referring in detail to the transmission 39, the input shaft 42 carries a first gear 44 which meshes with a gear 50 on an intermediate shaft 46. The shaft 46 further carries a gear 48 which rotates in response to rotation of the gear 50 and meshes with a gear 52 on a hollow cylindrical sleeve 54 for the left-hand end portion of the screw 30. The gear 52 rotates the sleeve 54 and the latter rotates the screw 30 by way of one or more axially parallel keys 56.

The gear 52 can be said to form a component part of the transmission 40 which further comprises an output shaft 58 rigid with a gear 60 which meshes with the gear 52. It will be noted that the diameter of the gear 60 is smaller than the diameter of the gear 52 so that the rotational speed of the screw 12, which is driven by the output shaft 58 through the intermediary of an overload clutch 62, exceeds the rotational speed of the screw 30. The clutch 62 comprises two readily separable clutch elements one of which is driven by the output shaft 58 and the other of which is mounted on the left-hand end portion of the screw 12 and receives torque from the one clutch element. Such construction of the clutch 62, coupled with the provision of a two-piece barrel 16, 18 (the hopper 10 is connected to or integral with the upper section or shell 18 of the barrel) renders it possible to gain access to the screws 12, 14 and to remove the screw 12 with little loss in time.

The right-hand end portion of the screw 14 in the first stage of the machine receives torque by way of an overload clutch 64 which is preferably similar to or identical with the clutch 62 to allow for rapid removal and reinsertion of the screw 14. The right-hand element of the clutch 64 is mounted on the output shaft 66 of the transmission 41. The output shaft 66 carries a gear 68 which meshes with a gear 70 on a sleeve 72 for the right-hand end portion of the screw 30. The sleeve 72 receives torque from the screw 30 by way of one or more axially parallel keys 74. The gears 52 and 70 of the transmissions 39 and 41 are mirror symmetrical to each other with reference to a plane which is normal to the axes of the screws 12, 14 and 30 and is located midway between the ends of the barrel 16, 18 and cylinder or barrel 28. Since the screw 30 must drive the screw 14, its diameter and material are selected accordingly so as to insure that the screw 30 will withstand the torsional stresses which arise when the machine is in use. The casings 76, 78, 80 of the transmissions 39, 40 and 41 contain suitable antifriction bearings for the respective shafts. Such bearings are shown but not specifically identified in FIGS. 1a and 1b.

The end portions of the screw 30 in the second stage of the machine are cooled by a circulating fluid. As shown in FIG. 1a, the left-hand end portion of the screw is connected with a supply conduit 82 which admits a coolant into an axial bore 84 of the screw 30. The bore 84 is surrounded by and communicates with a channel 86 which extends to the left-hand end face of the screw 30 and discharges spent coolant into a return conduit 90 by way of a funnel 88. The right-hand end portion of the screw 30 is provided with an axial bore 96 and a channel 98. The bore 96 receives fresh coolant by way of a supply conduit 92 and the channel 98 discharges spent coolant into a return conduit 94 by way of a funnel 100.

The driven left-hand end portion of the screw 12 extends beyond the barrel 16, 18 and is sealingly surrounded by an annular packing 102, e.g., an O-ring, a Simmer ring, a retaining ring or the like. A similar packing (not specifically shown in FIG. 1b) is provided for the right-hand end portion of the screw 14 which extends beyond the respective end of the barrel 16, 18.

The end portions of the screw 30 in the second stage of the machine are properly sealed to prevent escape of plasticized material from the cylinder 28. The left-hand end portion of the screw 30 is provided with helical threads 104 having a relatively small pitch and surrounded by a ring-shaped closure or cap 108 which is bolted to the respective end of the barrel 28 and to the casing 78. When the screw 30 rotates in the direction determined by the transmission 39, the threads 104 transport any plasticized material which enters their range in a direction toward the discharging member 34, i.e., away from the cap 108. Any volatiles which develop in the barrel 28 are free to escape by way of the helical groove defined by the threads 104 and by way of relatively large openings 112 provided in the cap 108.

The right-hand end portion of the screw 30 has threads 106 surrounded by a removable ring-shaped closure or cap 110 which is provided with openings 114 for escape of volatiles. The threads 106 also move the plasticized material toward the discharging member 34. The cap 110 is bolted to the casing 80 and to the right-hand end of the barrel 28.

The openings 112, 114 in the caps 108, 110 are preferably separated from each other by relatively narrow webs or spokes to allow for practically unimpeded circulation of air between the cap 108 and the casing 76, 78 on the one hand and between the cap 110 and casing 80 on the other hand. This reduces the transfer of heat from the barrel 28 to the casings 76, 78 and 80. The caps 108, 110 are further provided with preferably annular channels 116, 118 for the circulation of a coolant to thereby further reduce the transfer of heat from the barrel 28 to the casings of the transmissions 39, 40 and 41. The manner in which a coolant is circulated through the channels 116, 118 is not shown in the drawing.

The just described construction of the transmissions 39, 40 and 41 render it possible to rotate the three screws 12, 14 and 30 by a single prime mover 36. Furthermore, the gear trains in the casings 76, 78 and 80 of the three transmissions can be readily designed to rotate each of the screws at a desired speed even if the prime mover 36 is constructed to rotate its output shaft 37 at a constant speed. The transmission casings 76, 78 and 80 can be opened to afford access to the respective gears, for example, if the prime mover 36 is a constant-speed motor and it is desired to change the rotational speed of the screws 12, 14 and/or the rotational speed of the screw 30 by replacing the illustrated gears with differently dimensioned gears. This might become necessary when the machine is to be converted from treatment of a first type of pulverulent plastic material to the treatment of a different type of plastic material.

The machine of FIGS. 1a, 1b and 2 is designed in such a way that the screw 30 can be readily removed from its barrel 28 for the purposes of inspection, cleaning and/or replacement. Such accessibility and removability of the screw 30 constitutes an advantageous feature of the machine, especially in view of the fact that the screw 30 serves as a means for transmitting torque to the screw 14 by way of the transmission 41.

The left-hand end portion of the screw 30 (this end portion is provided with the aforementioned axial bore 84 and channel 86) has a diameter which at least equals the maximum diameters of the two flights on the screw 30. The diameter of the right-hand end portion of the screw 30 is less than or at most equals the diameter of the left-hand end portion. Thus, in order to remove the screw 30 through the sleeve 54, the operator must merely remove the keys 56, 74 and disconnect the screw 30 from the conduits 82, 90, 92, 94 (or disconnect these conduits from the coolant-supplying and receiving parts of the machine). It is clear that, if the diameter of the right-hand end portion of the screw 30 equals the diameter of the left-hand end portion, the screw 30 can be withdrawn in a direction to the right or to the left. Also, if the diameter of the right-hand end portion exceeds the maximum diameter of the remaining part of the screw 30 (including the diameter of the left-hand end portion), the screw 30 can be withdrawn and reinserted only through the right-hand sleeve 72.

The access to the screws 12, 14 in the first stage of the machine presents no problems because the upper section or shell 18 of the barrel for these screws is pivotable with reference to the lower section or shell 16. Thus, the screws 12, 14 can be readily inspected, cleaned and/or replaced merely by opening the barrel and by disengaging the two elements of the clutches 62 and 64. The barrel for the screws 12, 14 will be opened not only for the purposes of inspecting and/or replacing these screws but also to allow for convenient cleaning of the interior of the barrel, for example, prior to introduction into the hopper 10 of a different pulverulent plastic material.

As mentioned before, the screws 12, 14 and 30 are subjected to negligible axial stresses because their design is mirror symmetrical with reference to a plane which crosses their axes and is located midway between the ends of the cylinder 28 and barrel 16, 18. This renders it possible to mount the screws in relatively simple and inexpensive bearings which need not take up any appreciable axial stresses. For example, it is sufficient to mount one end portion of each screw in a radial bearing preferably a radial ball bearing which need not be designed to prevent axial movements of the respective screw, while the other end portion of each screw remains freely movable as for instance the left-hand end portion of screw 12 in FIG. 1b. As a rule, each screw centers itself in a fully automatic way as soon as it starts to convey plastic material toward the outlets 20, 22 (screws 12, 14) or toward the discharging member 34 (screw 30). This is due to the fact that the forces acting upon one half of each screw are properly balanced by the forces acting upon the other half when the respective screw assumes the illustrated axial position.

Figure 3A:
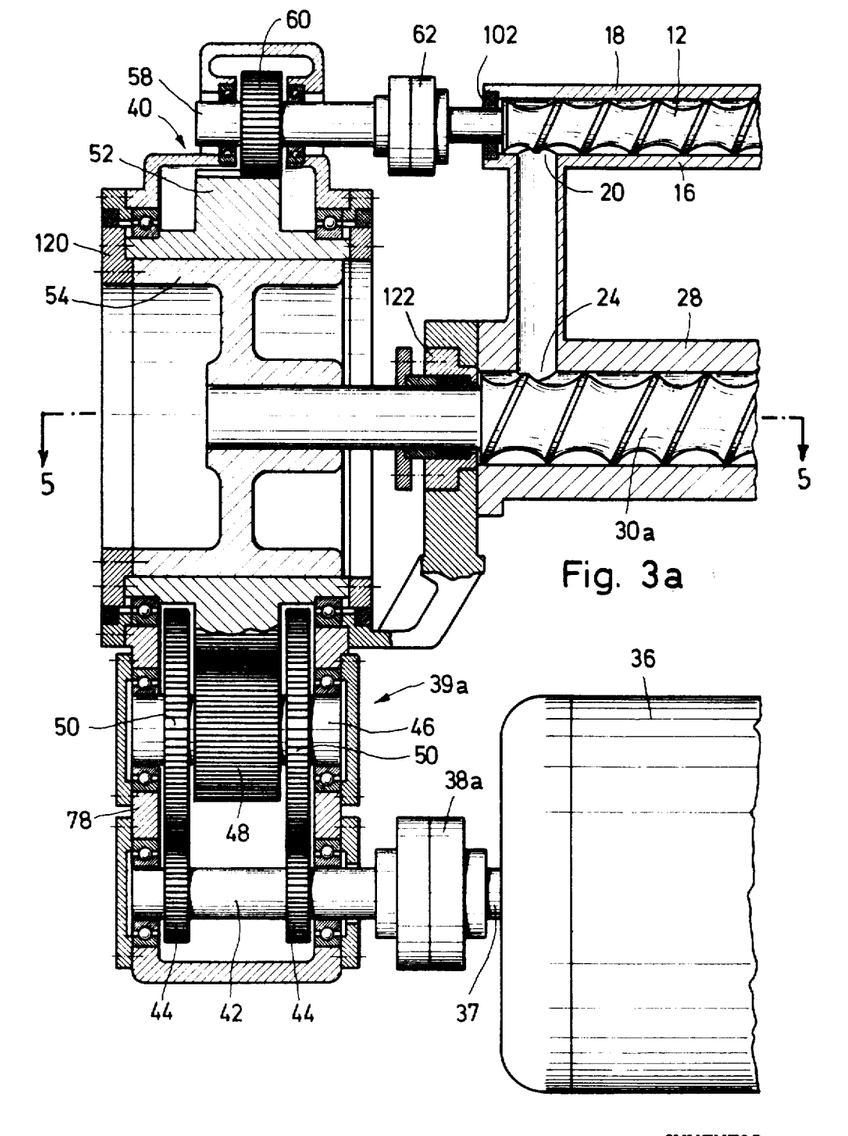
FIG. 3a is a longitudinal vertical sectional view of the left-hand portion of a second multistage machine wherein the extruder comprises two screws.
Figure 3B:
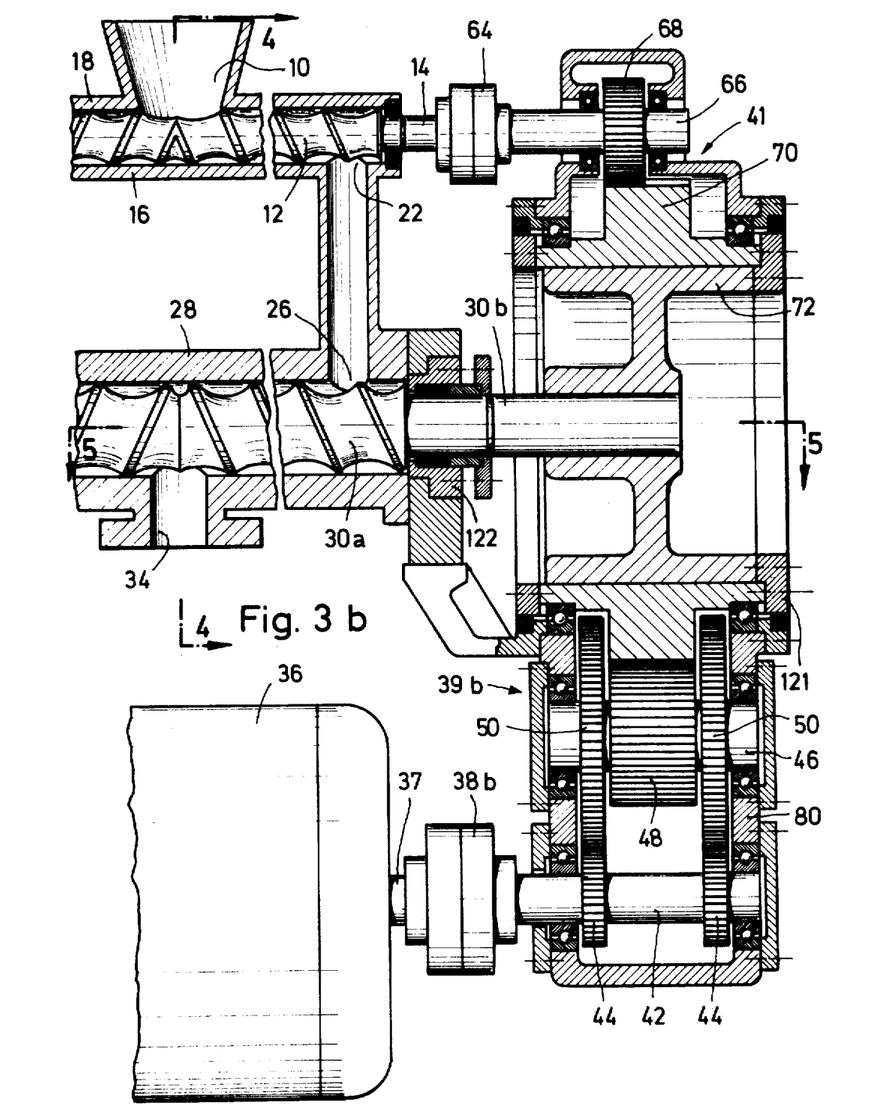
FIG. 3b is a similar longitudinal vertical sectional view of the right-hand portion of the second machine.
Figure 4:
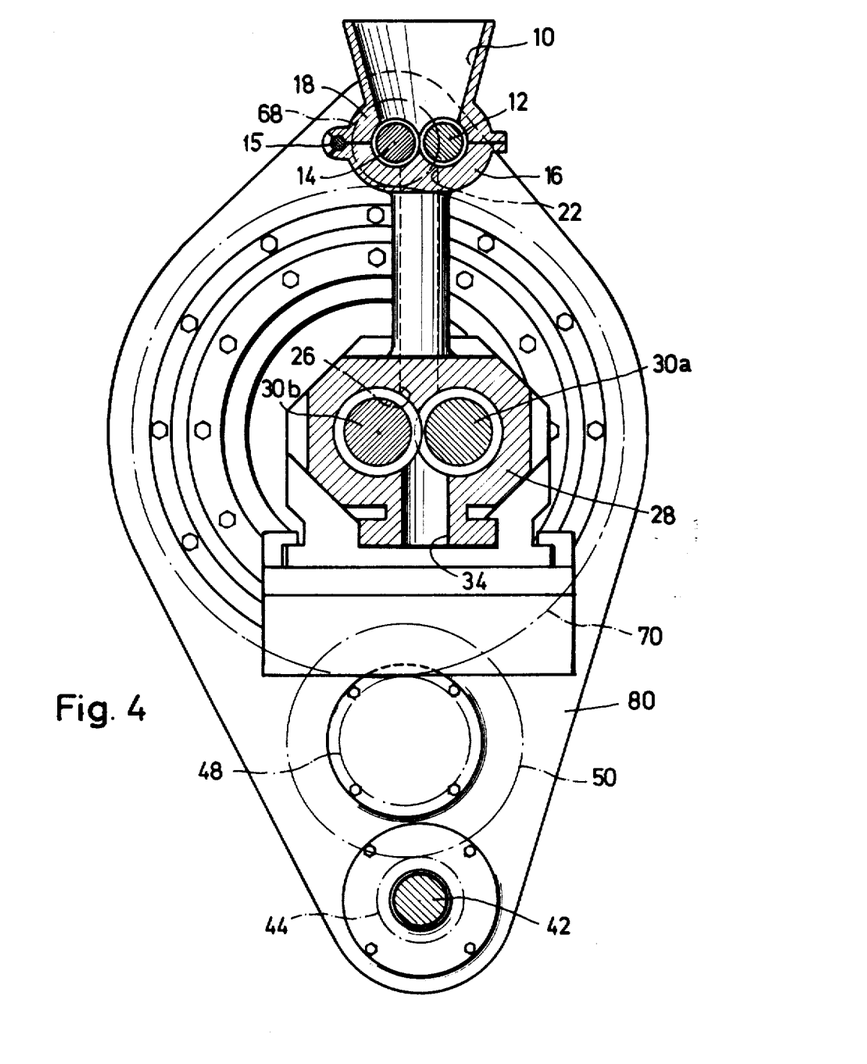
FIG. 4 is a transverse vertical sectional view as seen in the direction of arrows from the lines 4—4 of FIG. 3b.
Figure 5:
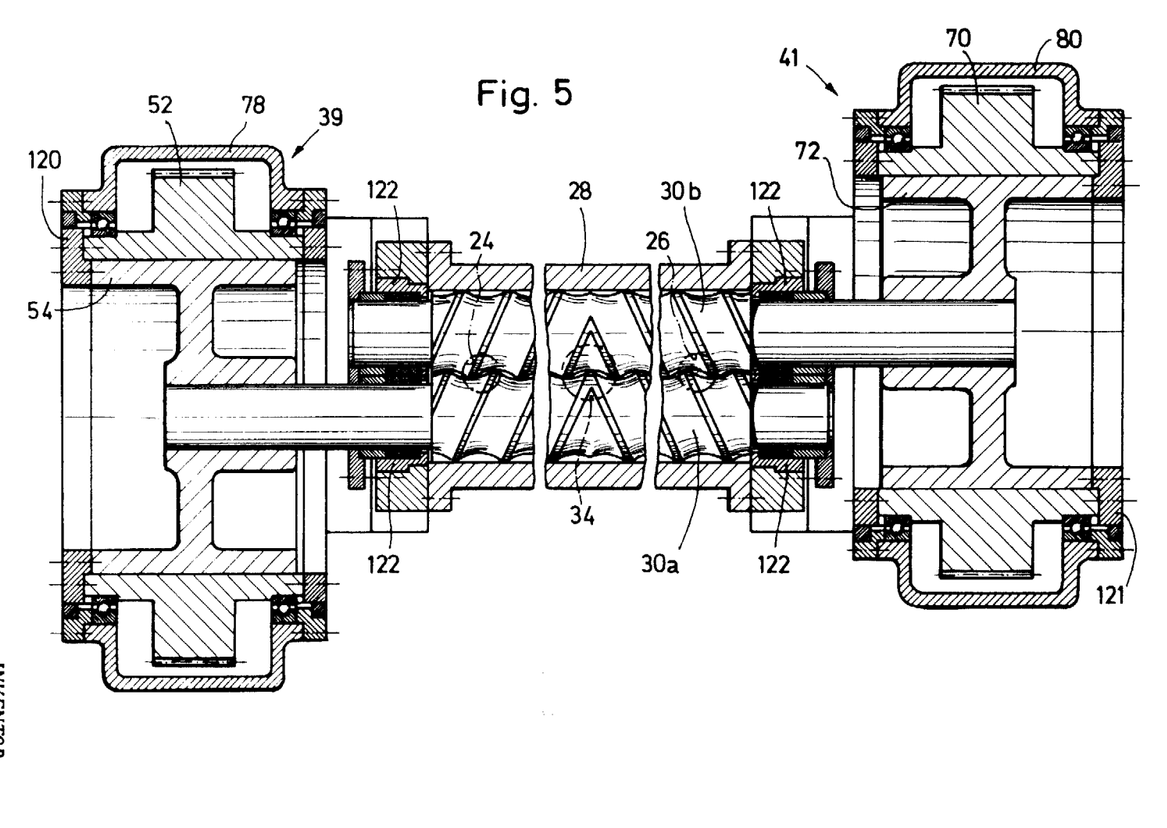
FIG. 5 is a fragmentary horizontal sectional view as seen in the direction of arrows from the lines 5—5 shown in FIGS. 3a and 3b.

FIGS. 3a, 3b, 4 and 5 illustrate a modified two-stage machine wherein all such parts which are identical with or clearly analogous to the corresponding parts of the heretofore described machine are denoted by similar reference characters. The main difference between the two machines is that the second stage of the machine shown in FIGS. 3a, 3b, 4 and 5 comprises two screws 30a, 30b whose flights mesh in a manner as shown in FIGS. 4 and 5. Another difference between the two machines is that each of the screws 30a, 30b in the second stage of the machine shown in FIGS. 3a, 3b, 4 and 5 drives one of the screws 12, 14 in the first stage.

The drive for the four screws 12, 14, 30a, 30b again employs a single prime mover 36 which is preferably an electric motor. However, the output shaft 37 extends beyond both ends of the motor housing and drives two discrete overload clutches 38a, 38b which respectively drive the input shafts 42 of two discrete gear transmissions 39a, 39b. The transmissions 39a, 39b respectively drive the screws 30a, 30b in the second stage of the machine. Save for certain minor structural differences which can be readily detected by comparing the FIGS. 1a, 1b with FIGS. 3a and 3b, each of the transmissions 39a, 39b shown in FIGS. 3a, 3b is identical with the transmission 39 of FIG. 1a. The parts of the transmissions 39a, 39b are therefore designated by the numerals employed in FIG. 1a for the parts of the transmission 39. It will further be noted that the configuration of the sleeves 54, 72 shown in FIGS. 3a and 3b differs from the configuration of similarly referenced parts in the machine of FIGS. 1a and 1b. The gear 52 on the sleeve 54 of FIG. 3a forms part of a gear transmission 40 which drives the screw 12, and the gear 70 on the sleeve 72 of FIG. 3b forms part of a gear transmission 41 which drives the screw 14.

Since the flights of the screws 30a, 30b inter-mesh (see FIGS. 4 and 5), the screw 30a or 30b cannot be readily removed independently of the screw 30b or 30a. In order to allow for convenient removal and reinsertion of the screws 30a and 30b, the machine of FIGS. 3a, 3b, 4 and 5 employs relatively large sleeves 54, 72 which are received in appropriately dimensioned axial bores of the respective gears 52, 70. Once the torque-transmitting connections between the sleeves 54, 72 and the gears 52, 70 are terminated, the parts 54, 30a, 30b or 30a, 30b, 72 can be removed as a unit, either through the bore of the gear 52 or through the bore of the gear 70. All that is necessary is to remove a ring 120 which transmits torque from the gear 52 to the sleeve 54 and/or the ring 121 which transmits torque from the gear 70 to the sleeve 72. The end portions of the barrel 28 for the screws 30a, 30b are provided with stuffing boxes 122, one for each end of the two screws, which might have to be dismantled in order to permit withdrawal of the screws 30a, 30b from the barrel 28. If the screws 30a, 30b are to be withdrawn through the gear 52, the screw 30b must be disconnected from the sleeve 72. The screw 30a will be disconnected from the sleeve 54 if the screws 30a, 30b are to be withdrawn (with the sleeve 72) through the axial bore of the gear 70. It will be seen that the machine of FIGS. 3a, 3b, 4 and 5 also permits for convenient removal or reinsertion of the rotary portion of the second stage even though such rotary portion comprises two intermeshing screws 30a, 30b.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a multistage machine for the plastification and extrusion of synthetic plastic materials, a combination comprising a first stage; a second stage, one of said stages having a barrel and a pair of intermeshing parallel rotary conveying screws in said barrel and the other stage having a barrel and at least one rotary screw in said barrel, each of said screws having mirror symmetrical left-hand and a right-hand flights meeting at the center of the respective screw and the screw of said other stage being parallel with the screws of said one stage; and drive means for rotating said screws, said drive means comprising a single prime mover and a plurality of transmissions receiving torque from said prime mover and arranged to rotate said screws, said transmissions including a first transmission arranged to receive torque from a screw of one of said stages and to transmit torque to a screw of the other stage, at least one of the screws which are connected to each other by said first transmission being removable from and reinsertable into the respective barrel by moving axially through said first transmission.

2. A combination as defined in claim 1, wherein said first transmission is arranged to receive and to transmit torque to one end portion of each of the two screws which are connected to each other by said first transmission.

3. A combination as defined in claim 1, wherein said one stage constitutes a plasticizer and wherein said drive means is arranged to drive said intermeshing screws at a speed which exceeds the speed of the screw of said other stage.

4. A combination as defined in claim 3, wherein said other stage comprises a single screw.

5. A combination as defined in claim 4, wherein the diameter of said single screw exceeds the diameters of said pair of screws.

6. A combination as defined in claim 4, wherein said single screw receives torque from said prime mover and drives at least one of said pair of screws.

7. A combination as defined in claim 4, wherein said transmissions include transmissions which transmit torque from the end portions of said single screw to said pair of intermeshing screws and wherein said first transmission is one of said pair of transmissions.

8. A combination as defined in claim 7, wherein said transmissions include a further transmission which transmits torque from said prime mover to said single screw.

9. A combination as defined in claim 1, wherein said transmissions are gear transmissions and said first transmission comprises a gear separably connected with said removable screw and having an axial bore large enough to permit passage of said removable screw.

10. A combination as defined in claim 1, wherein each of said stages comprises a pair of intermeshing screws, said screws of said one stage being arranged to rotate at a speed which exceeds the speed of screws of said other stage.

11. A combination as defined in claim 10, wherein one of said transmissions is arranged to transmit torque from one screw of said other stage to one screw of said one stage and another of said transmissions is arranged to transmit torque from the other screw of said other stage to the other screw of said one stage, one of said last mentioned transmissions constituting said first transmission.

12. A combination as defined in claim 11, wherein said prime mover comprises a rotary output member and said transmissions further include two additional transmissions one of which transmits torque from said output member to one screw of said other stage and the other of which transmits torque from said output member to the other screw of said other stage.

13. A combination as defined in claim 12, wherein said transmissions are gear transmissions and wherein said first transmission includes a gear separably coupled with one of said screws of said other stage and having a bore large enough for simultaneous passage of both screws of said other stage.

14. A combination as defined in claim 1, further comprising means for cooling the end portions of at least one of said screws.

15. A combination as defined in claim 1, wherein at least one of said transmissions comprises interchangeable gears to allow for changes in the ratio of such transmission.

16. A combination as defined in claim 1, further comprising radial bearing means for one end portion of at least one of said screws.

17. A combination as defined in claim 1, wherein at least one end portion of at least one of said screws is freely movable within the respective barrel.

18. A combination as defined in claim 1, wherein of the pair of screws of said one stage at least one of the screws is provided with at least one sealing member having an outer ridge at least substantially closing the screw thread formed by successive turns of the flight(s) of this screw and wherein the other screw of said pair of screws is provided with at least one corresponding recess which interrupts its flight(s) in the region(s) meshing with said at least one sealing member.

19. A combination as defined in claim 1, further comprising feeding means for introducing plastic material into the barrel of said one stage, said feeding means being disposed midway between the ends of the respective barrel.

20. A combination as defined in claim 19, wherein the flights of said pair of screws are arranged to convey plastic material from said feeding means toward both ends of the respective barrel, said barrel of said one stage having outlets provided at the ends thereof for admission of plastic material into inlets provided in the end portions of the barrel of said other stage, said barrel of said other stage having a central portion provided with means for discharging plastic material and said screw of said other stage being arranged to convey plastic material from said inlets toward said central portion.

21. A combination as defined in claim 1, wherein one of said barrels comprises a plurality of relatively movable sections.

22. A combination as defined in claim 21, wherein said last mentioned barrel forms part of said one stage and said separable sections include a lower section and an upper section articulately connected with said lower section.

References Cited
UNITED STATES PATENTS

| | | | |
|---|---|---|---|
| 2,868,517 | 1/1959 | Lasch | 259—6 |
| 3,154,808 | 11/1964 | Ahlefeld | 259—192 |
| 3,349,725 | 10/1967 | Bini | 259—192 |
| 3,541,652 | 11/1970 | Fischer | 259—192 |
| 3,565,403 | 2/1971 | Matsuoka | 259—6 |

ROBERT W. JENKINS, Primary Examiner

U.S. Cl. X.R.

259—6, 104